US011711125B2

(12) United States Patent
Zhu et al.

(10) Patent No.: US 11,711,125 B2
(45) Date of Patent: Jul. 25, 2023

(54) PERFORMING ENHANCED SOUNDING PROCEDURES USING BEAMFORMING TECHNIQUES

(71) Applicant: INTERDIGITAL CE PATENT HOLDINGS, Paris (FR)

(72) Inventors: Wei Zhu, Shanghai (CN); Yong Yang, Shanghai (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 13 days.

(21) Appl. No.: 16/623,090

(22) PCT Filed: Jun. 16, 2017

(86) PCT No.: PCT/CN2017/088615
§ 371 (c)(1),
(2) Date: Dec. 16, 2019

(87) PCT Pub. No.: WO2018/227546
PCT Pub. Date: Dec. 20, 2018

(65) Prior Publication Data
US 2020/0127718 A1    Apr. 23, 2020

(51) Int. Cl.
*H04B 7/06* (2006.01)
*H04W 76/11* (2018.01)
*H04W 16/28* (2009.01)

(52) U.S. Cl.
CPC ......... *H04B 7/0617* (2013.01); *H04B 7/0643* (2013.01); *H04B 7/0663* (2013.01); *H04W 16/28* (2013.01); *H04W 76/11* (2018.02)

(58) Field of Classification Search
CPC .. H04B 7/0617; H04B 7/0643; H04B 7/0663; H04B 7/0634; H04W 76/11; H04W 16/28
See application file for complete search history.

(56) References Cited

U.S. PATENT DOCUMENTS

| | | | |
|---|---|---|---|
| 9,066,170 | B2 | 6/2015 | Forutanpour et al. |
| 9,253,592 | B1 | 2/2016 | Moscovich et al. |
| 9,472,844 | B2 | 10/2016 | Kasher |
| 9,516,563 | B2 | 12/2016 | Maltsev et al. |
| 2006/0164969 | A1 | 7/2006 | Malik et al. |
| 2012/0026909 | A1 | 2/2012 | Seok |
| 2013/0215947 | A1* | 8/2013 | Yao .................. H04B 7/0617 375/267 |
| 2014/0070995 | A1 | 3/2014 | Itagaki |
| 2014/0370884 | A1 | 12/2014 | Kummetz et al. |

(Continued)

FOREIGN PATENT DOCUMENTS

| | | |
|---|---|---|
| CN | 103001744 A | 3/2013 |
| CN | 103684553 A | 3/2014 |

(Continued)

*Primary Examiner* — Rushil Parimal Sampat
(74) *Attorney, Agent, or Firm* — Volpe Koenig

(57) ABSTRACT

It is provided a method performed by a beamformer device for channel sounding in a network including a beamformer device and at least one beamformee device. In each round of channel sounding, the beamformer device may send an announcement message including identification information of beamformee devices included in a list when the list is not empty and clearing the list, wherein the beamformee devices included in the list have moved a distance exceeding a threshold value.

9 Claims, 6 Drawing Sheets

(56) References Cited

U.S. PATENT DOCUMENTS

| | | | |
|---|---|---|---|
| 2015/0117322 A1 | 4/2015 | McGrath et al. | |
| 2015/0312113 A1 | 10/2015 | Forutanpour et al. | |
| 2016/0036572 A1* | 2/2016 | Bhanage | H04W 16/28 |
| | | | 370/329 |
| 2016/0233932 A1* | 8/2016 | Hedayat | H04L 5/0048 |
| 2016/0254884 A1* | 9/2016 | Hedayat | H04B 7/063 |
| | | | 370/329 |
| 2016/0301452 A1* | 10/2016 | Kwon | H04B 7/0617 |
| 2017/0064568 A1* | 3/2017 | Elsherif | H04B 7/0452 |
| 2017/0251449 A1* | 8/2017 | Malik | H04W 64/003 |
| 2018/0026692 A1* | 1/2018 | Shanmugavadivel | |
| | | | H04B 7/0617 |
| | | | 370/329 |

FOREIGN PATENT DOCUMENTS

| | | |
|---|---|---|
| CN | 106658741 A | 5/2017 |
| CN | 106664156 A | 5/2017 |
| WO | 2015171336 A1 | 11/2015 |
| WO | 2016005977 A1 | 1/2016 |

\* cited by examiner

PERFORMING ENHANCED SOUNDING PROCEDURES USING BEAMFORMING TECHNIQUES

This application claims the benefit, under 35 U.S.C. § 371 of International Application PCT/CN2017/088615, filed Jun. 16, 2017, which was published in accordance with PCT Article 21(2) on Dec. 20, 2019, in English.

TECHNICAL FIELD

The present disclosure relates to signal transmission, and more particularly relates to a method and device for channel sounding in a wireless system.

BACKGROUND 802.11ac is an evolutionary improvement to 802.11n. One of the goals of 802.11ac is to deliver higher levels of performance that are commensurate with Gigabit Ethernet networking. Wi-Fi 802.11ac introduces several new features. One feature is multi-user multiple input multiple output (MU-MIMO) where an access point transmits simultaneously to multiple clients. With 802.11n, a device can transmit multiple spatial streams at once, but only directed to a single address. For individually addressed frames, this means that only a single device (or user) gets data at a time. This is termed single-user MIMO (SU-MIMO). With 802.11ac, an AP is able to use its antenna resources to transmit multiple frames to different clients, all at the same time and over the same frequency spectrum. If 802.11n is like a hub, 802.11ac can be thought of as a wireless switch (on the downlink). To realize this, MU-MIMO uses beamforming. As to beamforming, in very simplified terms, beamforming is all about focusing a signal in a specific direction. Compared to traditional broadcast that broadcast data in all directions, beamforming allows an AP or a router to determine where the device, e.g. laptop, tablet etc. is located and project a stronger signal in that specific direction. Thus, the more effective of beamforming works, the higher quality service offers by 802.11ac Wi-Fi AP.

SUMMARY

According to an aspect of the present disclosure, a method performed by a beamformer device for channel sounding in a network comprising a beamformer device and at least one beamformee device is provided. The method comprises in each round of channel sounding, sending an announcement message including identification information of beamformee devices included in a list when the list is not empty and clearing the list, wherein the beamformee devices included in the list have moved a distance exceeding a threshold value.

According to another aspect of the present disclosure, it is provided a beamformer device for channel sounding in a network comprising the beamformer device and at least one beamformee device. The beamformer device comprises a transceiver; a storage configured for storing a list that is used to store identification information of beamformees; and a processor configured for in each round of channel sounding, send, via the transceiver an announcement message including identification information of beamformee devices included in the list when the list is not empty and clearing the list, wherein the beamformee devices included in the list have moved a distance exceeding a threshold value.

According to another aspect of the present disclosure, it is provided a computer program comprising program code instructions executable by a processor for implementing a method described above.

According to another aspect of the present disclosure, it is provided a computer program product which is stored on a non-transitory computer readable medium and comprises program code instructions executable by a processor for implementing a method described above.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DETAILED DESCRIPTION

Figure 1:
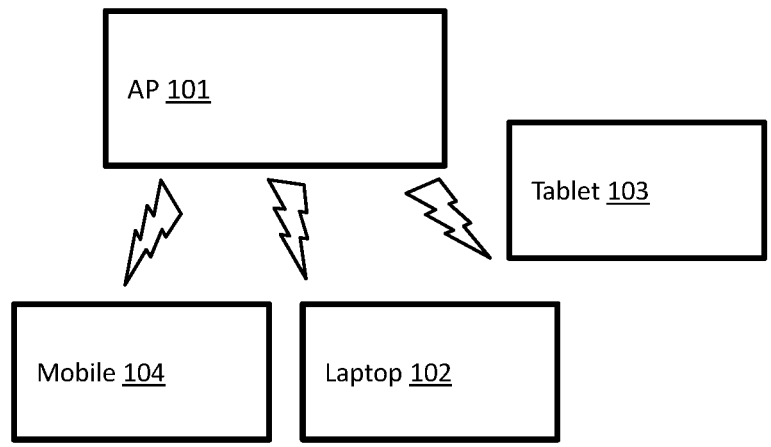
FIG. 1 is a diagram showing a system for beamforming procedure according to an embodiment of present disclosure.

The embodiment of the present invention will now be described in detail in conjunction with the drawings. In the following description, some detailed descriptions of known functions and configurations may be omitted for clarity and conciseness.

IEEE 802.11ac standard depicts a standards-based beamforming. Any device (with multiple antennas) can beamform to any other device at any time. What IEEE 802.11ac adds is the opportunity for the receiver to help the beamforming transmitter to do a better job of beamforming. This is called "sounding," and it enables the beamformer (a station that transmits physical layer protocol data unit using a beamforming steering matrix) to precisely steer its transmitted energy toward the beamformee (a station that receives a physical layer protocol data unit that was transmitted using a beamforming steering matrix and that supports a transmit beamforming feedback mechanism). IEEE 802.11ac defines a single, though optional, protocol for one IEEE 802.11ac device to sound other IEEE 802.11ac devices. The beamforming works as follows. A device, typically an AP, sends a "Very High Throughput (VHT) Null Data Packet (NDP)

Announcement" frame. Its only purpose is to contain the address of the AP and of the target recipients. The VHT NDP Announcement frame is immediately followed by a "VHT Null Data Packet" (VHT NDP) intended for those target recipients (or receiver, receiving devices). Each intended recipient measures the radio frequency (RF) channel from the AP to itself using the preamble of the VHT NDP and compresses the channel, i.e. each intended recipient calculates a feedback matrix. The first intended recipient responds with the compressed channel information in a VHT Compressed Beamforming frame immediately (the action frame header filled in the header of the compressed beamforming frame indicates that the compressed beamforming frame contains a feedback matrix), and other recipients respond when they are polled by the AP. After the beamformer obtains the feedback matrix from intended recipients, it determines a steering matrix by using feedback matrices from the beamformees. The steering matrix is used to steer the transmission to each intended recipient. Herein, the feedback matrix consists in a local measure of the channel using "training symbols" previously transmitted by the beamformer. The beamformee sends it in a compressed state to the beamformer, which continues the process by sending a "Beamforming Report Poll" to the next beamformee. The steering matrix then provides the information used to create the space-time streams in a way that it suppresses crosstalk between participating beamformees. And the beamformee recreates its feedback matrix on each NDP sounding PPDU received.

The number of the recipients and the complexity of the matrix are the key factors for a beamformer to finish one cycle of beamformee procedure. When the number of intended recipients or beamformees increases, this cost of airtime, during which the beamformer transmits the beamforming messages and obtains the feedback matrix from all intended recipients, is accumulated. It means the normal Wi-Fi data transmission will be interrupted for a relatively long time.

In order to simplify the procedure of beamforming and consequently improve the Wi-Fi performance, the present disclosure introduces a beamforming technology applicable in a system that comprises at least one device that is movable, e.g. mobile device. Whether or not beamforming is used depends on mobile device's movement distance.

FIG. 1 is a diagram showing a system for beamforming procedure according to an embodiment of present disclosure. The system comprises an access point (AP) 101 and several recipient devices comprising a mobile 104, a laptop 102 and a tablet 103. In the embodiment, all devices are compatible with IEEE 802.11ac standard, i.e. they support beamforming feature. The recipient devices 102, 103, 104 (hereinafter referred to as beamformee individually and beamformees collectively) are able to obtain information about their movement, e.g. movement distance, if they are mobile. The AP 101 (hereinafter referred to as beamformer) transmits beamforming messages periodically and receives feedback matrices from beamformees. The beamforming is not transmitted to all beamformees, but only the beamformees that moves a distance exceeding a threshold value. The advantage is that for beamformees that do not move or moves a distance not exceeding the threshold value, the beamformer 101 can still use previously received feedback matrices. Concerning the beamformees that move a distance exceeding the threshold value, it is very likely that the beamformees have left the best position of the fine-tuned beamforming coverage and are having a poor and downgraded Wi-Fi performance, and consequently, the beamformer 101 needs to adjust projection direction of the signals to each of these beamformees. With this method, the station list in a NDP announcement frame is shortened and the time duration of a cycle in which the beamformer 101 transmits beamforming and receives feedback matrices from intended beamformees is decreased.

Figure 2:
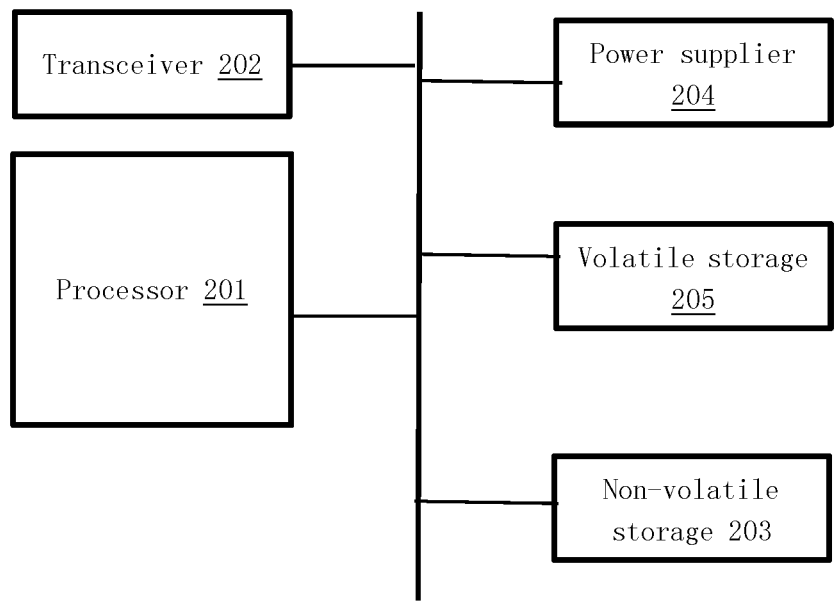
FIG. 2 is a block diagram of an exemplary beamformer 101, e.g. an AP according to an embodiment of the present disclosure.

FIG. 2 is a block diagram of an exemplary beamformer 101, e.g. an AP according to an embodiment of the present disclosure.

It includes at least one microprocessor (MPC) or processor 201, at least one transceiver 202, a non-volatile storage 203, a power supply 204, and a volatile storage 205. It shall note the block diagram is not exhaustive for the beamformer. The block diagram focuses on the modules and parts relating to beamforming procedure, and omits modules and parts not necessary for an understanding of the beamforming procedure described herein.

The MPC 201 is used to process program instructions stored on the non-volatile storage 203.

The transceiver 202 is used to receive and send data and signal from and to the beamformees. It at least comprises an IEEE 802.11ac Wi-Fi transceiver.

The non-volatile storage 203 is used to store data and program instructions, which remain in the non-volatile storage 203 if it is not powered. In some implementations, it can use read only memory (ROM), flash etc. As to flash, it can use NOR flash and NAND flash.

The power supply 204 is used to supply power to all modules of the beamformer 101. In an example, it converts alternating current to a 5 V direct current.

The volatile storage 205 is used to store temporary data. In implementations, it can use volatile random access memory (RAM), e.g. SDRAM. In the present embodiment, it is used in part to store a list of beamformees that move a distance exceeding the threshold value.

Figure 3:
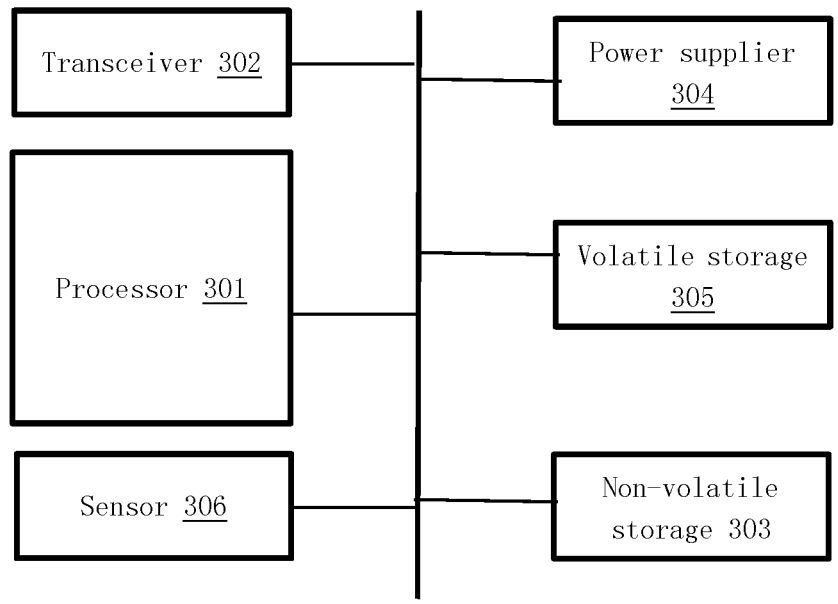
FIG. 3 is a block diagram of an exemplary beamformee 102, 103, 104 according to an embodiment of the present disclosure.

FIG. 3 is a block diagram of an exemplary beamformees of FIG. 1 102, 103, 104 according to an embodiment of the present disclosure. It shall note the block diagram is not exhaustive for the beamformee. The block diagram focuses on the modules and parts relating to beamforming procedure, and omits modules and parts that are not needed for an understanding of the beamforming procedure.

The beamformee of FIG. 3 includes at least one microprocessor (MPC) or processor 301, at least one transceiver 302, a non-volatile storage 303, a power supply 304, a volatile storage 305 and a sensor 306.

The MPC 301 is used to process program instructions stored on the non-volatile storage 303.

The transceiver 302 is used to receive and send data and signal from and to the beamformer. It at least comprises an IEEE 802.11ac Wi-Fi transceiver.

The non-volatile storage 303 is used to store data and program instructions, which remain in the non-volatile storage 303 if it is not powered. In implementations, it can use read only memory (ROM), flash etc. As to flash, it can use NOR flash and NAND flash. In the embodiment, a threshold value is stored in the non-volatile storage. The threshold value is used to compare with the moving distance of the beamformee between the previous position and current position. The comparison result decides whether or not to trigger a transmission of a notification or message to the beamformer 101.

The power supply 304 is used to supply power to all modules of the beamformee. In an example, it converts alternating current to a 5 V direct current.

The volatile storage 305 is used to store temporary data. In implementations, it can use volatile random access memory (RAM), e.g. SDRAM. In the present embodiment, it is used in part to store a movement distance of the beamformee.

The sensor 306 is used to obtain the moving distance of the beamformee. In an implementation, the sensor 306 is a built-in accelerometer. The accelerometer is used to detect the acceleration value of the beamformee, which will be used to calculate the distance. In another implementation, the sensor 306 further comprises a gyroscope, which is used to calculate the orientation change of the beamformee. The accelerometer and gyroscope are used together to calculate a straight line distance between the initial position and current position of the beamformee.

Figure 4:
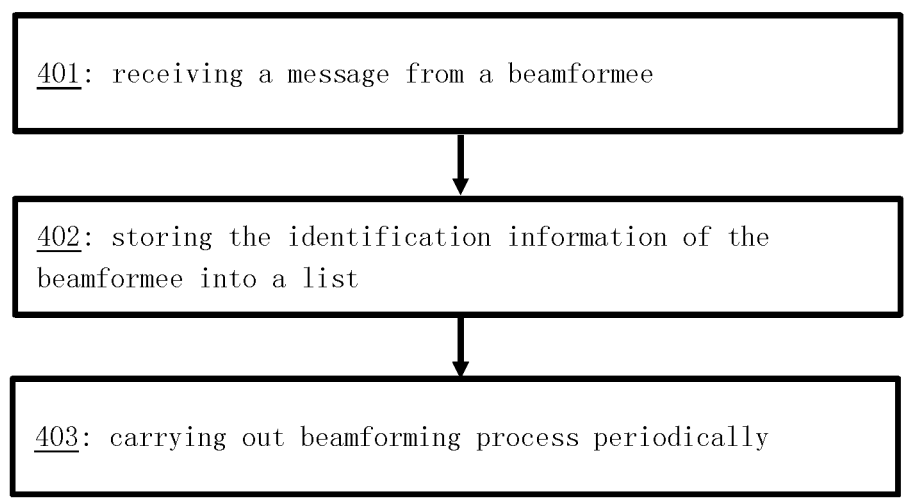
FIG. 4 is a flow chart showing a method for beamforming procedure according to the embodiment of the present disclosure.

FIG. 4 is a flow chart showing a method for beamforming procedure according to the embodiment of the present disclosure.

At step 401, a beamformer, e.g. an AP, receives a message from an beamformee that moves a distance exceeding a threshold value. Specifically, the MPC 301 of the beamformee uses the output data of the sensor 306 of the beamformee to calculate the distance, and determines if the distance exceeds the threshold value stored in the non-volatile storage 303. If the MPC 301 determines the distance exceeds the threshold value, the MPC 301 constructs a notification or message and uses the transceiver 302 to send out the notification or message to the beamformer. Herein the notification or message includes identification information of the beamformee, that uniquely identifies the beamformee.

At step 402, the beamformer stores the identification information of the beamformee into a list in the volatile storage 205 of the beamformer. It shall note that the list does not have duplicate information, which means that the MPC 201 of the beamformer determines, when a new message or notification arrives, if there is a record having the same identification information as that in the message or notification. So the list includes identification information of beamformees that move a distance exceeding the threshold value and does not include identification information of beamformees that do not move or moves a distance not exceeding the threshold value. In most cases, the list does not include all beamformees that are associated with the beamformer.

Figure 5:
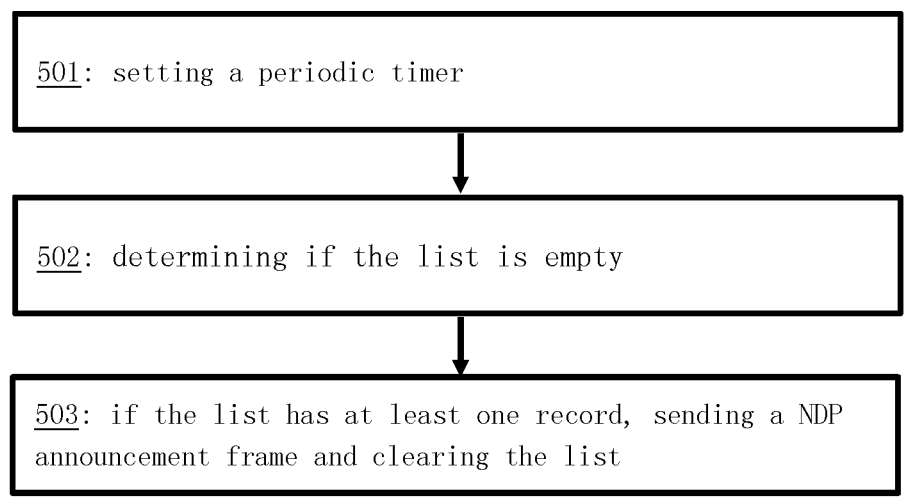
FIG. 5 is a flow chart showing a method for the step 403 according to the embodiment of the present disclosure.

At step 403, in each round or cycle of channel sounding that the beamformer carries out periodically, the beamformer determines if the list is empty. If the list has no record, the beamformer does nothing and waits for the next round or cycle of the beamforming process. If the list has at least one record, the beamformer uses the records in the list to construct station info of the NDP announcement frame and then uses a standard IEEE 802.11ac beamforming procedure to send the NDP announcement frame and receives the feedback matrices from the beamformees whose identification information is included in the NDP announcement frame. And then the beamformer clears the list. Below explain the details of the step 403 in connection with FIG. 5 according to the embodiment of the present disclosure. It shall note that the step 403 and the steps 401, 402 are carried out in parallel, not in succession in time. It means the steps 401 and 402 may occur anytime, and the records in the list will be used for the next round of beamforming process.

At step 501, the MPC 201 of the beamformer sets a periodic timer that triggers a round of beamforming process each time the value of periodic timer lapses to 0.

At step 502, in each round of beamforming process, the MPC 201 of the beamformer determines if the list stored in the volatile storage 205 is empty. This is implemented by count the number of the records in the list.

Figure 6:
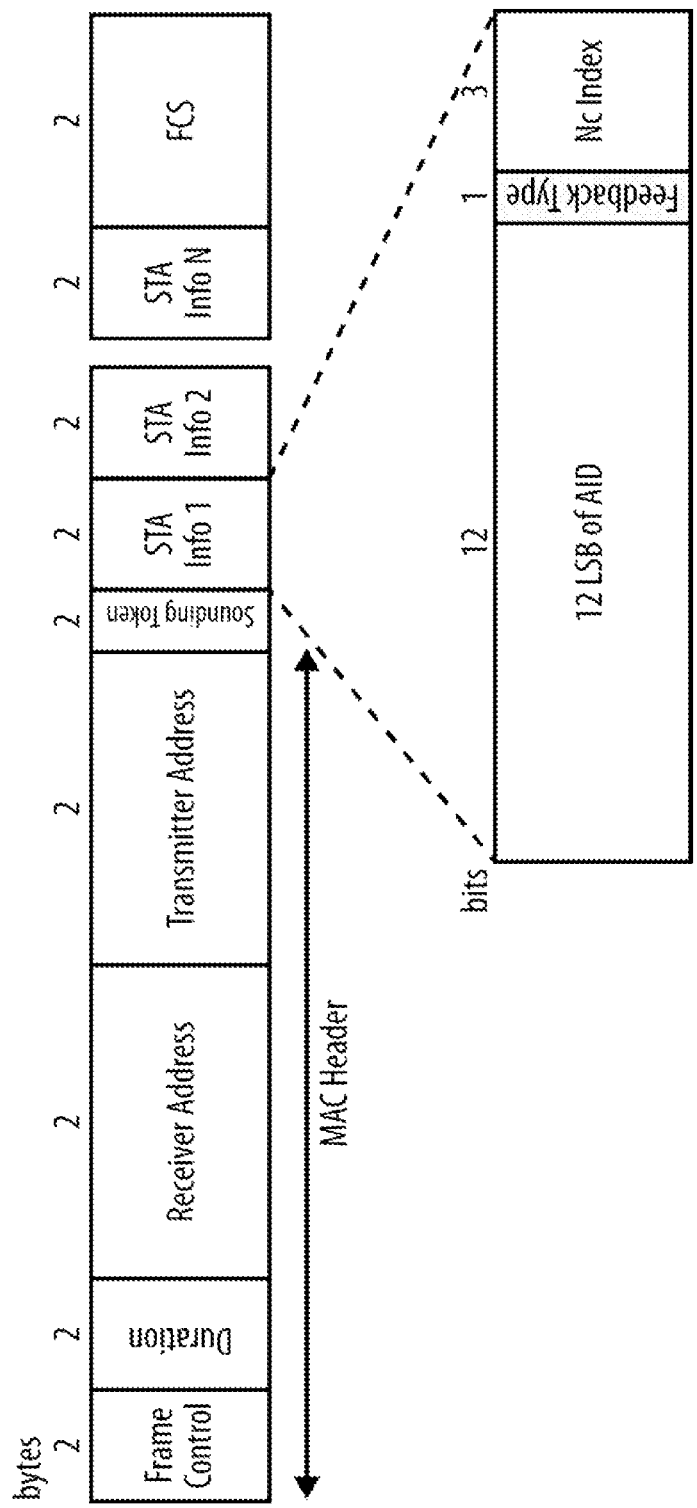
FIG. 6 is a diagram showing a NDP announcement frame according to the embodiment of the present disclosure.

At step 503, if the list has at least one record, the MPC 201 of the beamformer constructs and sends a NDP announcement frame as shown in FIG. 6 and deletes all records in the list. The definition of the NDP announcement frame is in compliance with the IEEE 802.11ac standard. The difference is that only the beamformees whose identification information is in the list are put into the station information field (STA Info data field). And then the beamformer receives feedback matrices from these beamformees. If the list is empty, the MPC 201 does nothing but waits for the next time when the timer expires.

Figure 7:
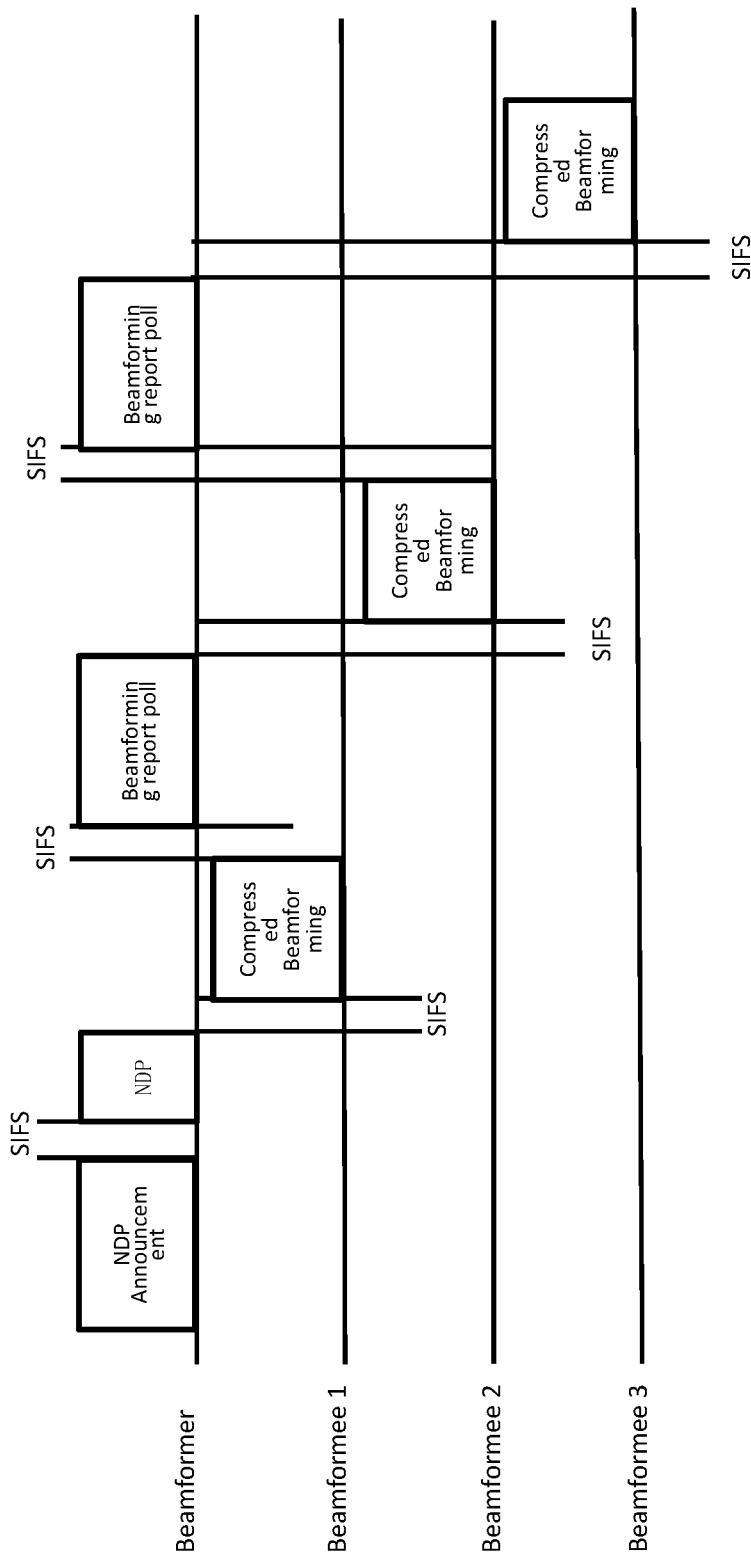
FIG. 7 is a diagram showing a multi-user channel sounding procedure according to the prior art.
Figure 8:
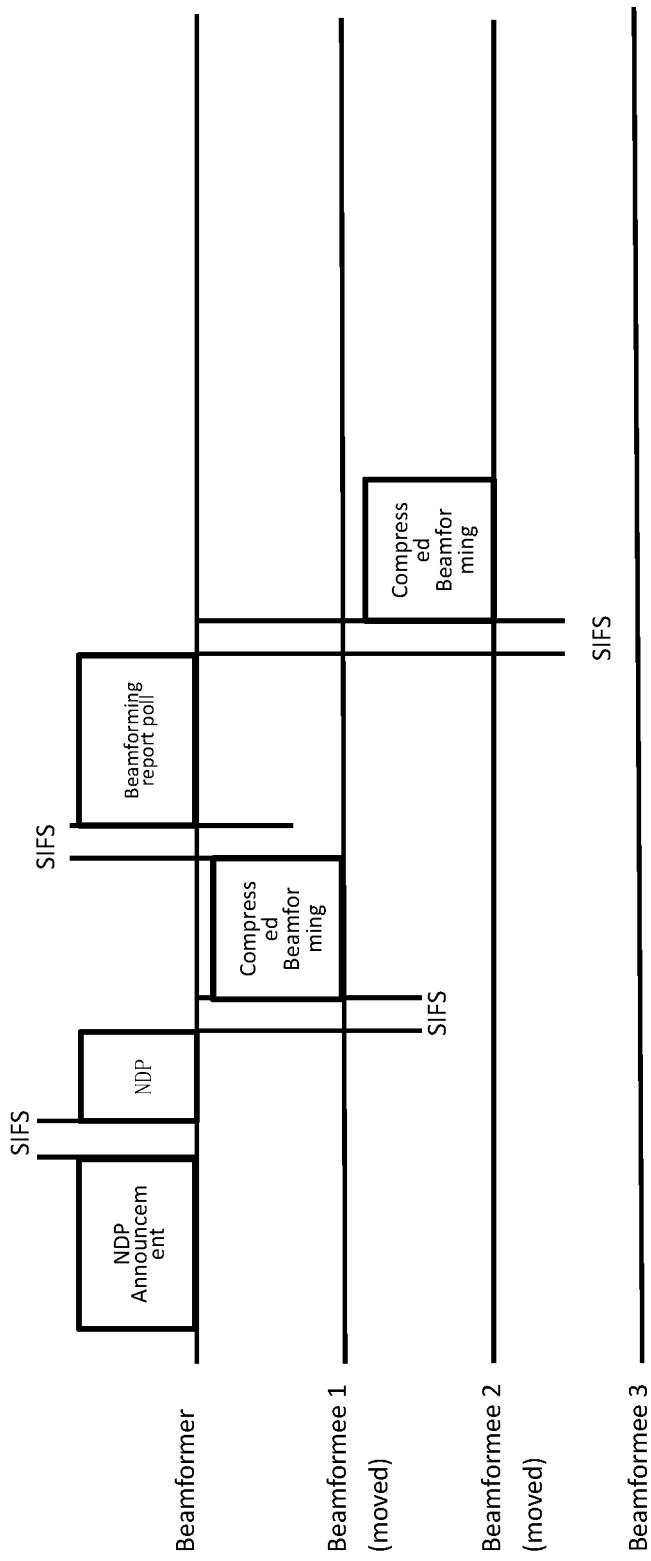
FIG. 8 is a diagram showing a multi-user channel sounding procedure according to the embodiment of present disclosure.

The description below introduces the advantages of the present disclosure in connection with the example as shown in the FIG. 1. In this example, we assume that mobile 104 is beamformee 1, tablet 103 is beamformee 2, laptop 102 is beamformee 3, and the mobile 104 and the tablet 103 both move a distance exceeding the threshold value. FIG. 7 is a diagram showing a multi-user channel sounding procedure according to the prior art while FIG. 8 is a diagram showing a multi-user channel sounding procedure according to the embodiment of present disclosure. As can be seen from the FIG. 7, the beamformer needs to send announcement frame and receives compressed beamforming frames including feedback matrices from all 3 beamformees before the beamformer generates a steering matrix to direct signal transmission. As shown in the FIG. 8, because the laptop 102 does not move or moves a distance not exceeding the threshold value, the station information of the laptop 102 is not included in the announcement frame, and the beamformer does not need to wait to receive compressed beamforming frame including feedback matrix from the laptop 102. And consequently, it saves some time used in the multi-user channel sounding procedure. The advantage becomes more significant as the number of beamformees associated with the beamformer increases.

In addition, each time a new beamformee is added into the network and becomes associated with the beamformer, the beamformee sends a notification to the beamformer. Then the beamformer adds the beamformee into the list.

In the above embodiment, the MPC 301 receives the output data from the sensor 306 and compares it with the threshold value. In a variant of the embodiment, the sensor 306 is an integrated circuit that also has a hardware processor. The hardware processor can determine if exceeding a threshold value, and sends a signal indicating the excess via the bus to the MPC 301 when the distance exceeds the threshold value.

In the embodiment described above, the moving distance of the beamformee is obtained via the sensor 306. In a variant of the embodiment, the moving distance is determined by a third part device and then the beamformee obtains it from the third party device. In another variant, the moving distance is manually inputted by an operator. In above two cases, the sensor 306 is redundant, and therefore can be removed from the beamformee.

In another variant of the embodiment, the beamformee provides a hardware interface, e.g. a hardware button or a software interface, e.g. a visual button in a graphic user interface, allowing, in response to a click on the button, the beamformee to send a notification to the beamformer. Then the beamformer adds the corresponding the beamformee into the list. This feature allows the user to manually add some beamformee into the list when he thinks the channel quality is not good and want the beamformer to adjust the steering matrix for this beamformee.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method comprising:
in a round of channel sounding in a network comprising a beamformer device and a plurality of beamformee devices:
  receiving, by the beamformer device, messages from first beamformee devices, wherein a message received from a first beamformee device indicates that the first beamformee device moved over a distance since a transmission of a preceding announcement message in a preceding round of channel sounding, and
  sending, by the beamformer device, an announcement message including identification information of the first beamformee devices from which the messages were received, wherein the announcement message does not include identification information of second beamformee devices that remained static since the transmission of the preceding announcement message.

2. The method of claim 1, further comprising:
storing identification information of the first beamformee device in a memory when there is no record for the first beamformee device.

3. The method of claim 1, wherein the announcement message is a null data packet announcement frame, the method further comprising:
constructing the null data packet announcement frame, wherein station info fields are filled in based on the identification information of the first beamformee devices.

4. The method of claim 2, further comprising:
receiving a further message from a new beamformee device that is newly added into the network;
and storing identification information of the new beamformee device in the memory.

5. A beamformer device comprising:
a transceiver;
a memory configured for storing identification information of beamformees; and
a processor configured to, in a round of channel sounding in a network comprising a beamformer device and a plurality of beamformee devices:
  receive messages from first beamformee devices, wherein a message received from a first beamformee device indicates that the first beamformee device moved over a distance since a transmission of a preceding announcement message in a preceding round of channel sounding; and
  send via the transceiver, an announcement message including identification information of the first beamformee devices from which the messages were received, wherein the announcement message does not include identification information of second beamformee devices that remained static since the transmission of the preceding announcement message.

6. The beamformer device of claim 5, wherein:
the processor is further configured for storing identification information of the first beamformee device in the memory when there is no record for the first beamformee device.

7. The beamformer device of claim 5, wherein the announcement message is a null data packet announcement frame, the processor is further configured for constructing the null data packet announcement frame, wherein station info fields are filled in based on the identification information of the first beamformee devices.

8. The beamformer device of claim 6, wherein:
the transceiver is further configured for receiving a further message from a new beamformee device that is newly added into the network; and
the processor is further configured for storing identification information of the new beamformee device in the memory.

9. A non-transitory computer readable storage medium comprising program code instructions executable by a processor for implementing a method including:
   in a round of channel sounding in a network comprising a beamformer device and a plurality of beamformee devices:
      receiving, by the beamformer device, messages from first beamformee devices, wherein a message received from a first beamformee device indicates that the first beamformee device moved over a distance since a transmission of a preceding announcement message in a preceding round of channel sounding, and
      sending, by the beamformer device, an announcement message including identification information of the first beamformee devices from which the messages were received, wherein the announcement message does not include identification information of second beamformee devices that remained static since the transmission of the preceding announcement message.

\* \* \* \* \*